Patented Nov. 10, 1931

1,831,469

UNITED STATES PATENT OFFICE

ARTHUR W. SEWALL, OF PHILADELPHIA, PENNSYLVANIA, ASSIGNOR TO THE BARBER ASPHALT COMPANY, OF PHILADELPHIA, PENNSYLVANIA, A CORPORATION OF WEST VIRGINIA

MINERAL SURFACING AND MINERALIZED ROOFING

No Drawing. Application filed July 18, 1925. Serial No. 44,622.

My invention relates to mineral surfacing material and mineral surfaced roofing, such as sheets and shingles of bituminously impregnated and coated fabric (e. g., paper felt) with mineral particles stuck in the coating of its weather side.

Heretofore, mineralized roofing of this character has been surfaced, on the one hand, with natural minerals in granular form, such as sand, stone, slate, or various crystalline minerals, or, on the other hand, with granules of artificial mineral material, such as crushed brick, terra cotta, and other burned or vitrified wastes from the ceramic industries. Also, nuggets or slabs of vitrified materials, specially prepared in the desired colors, have been crushed and screened or otherwise classified to afford colored surfacing granules.

While surfacing with natural and artificial materials such as above indicated increases the durability of roofing and somewhat improves its appearance, it generally fails, nevertheless, of producing satisfactory decorative effects, owing to the more or less uncertain and haphazard color character or shade of these materials. The crushing of specially prepared and colored vitrified materials is commercially impracticable, both on account of the initial high cost of such materials, and because of the considerable waste of the costly material involved in crushing and classifying.

I aim to improve the appearance and decorative value of mineral surfaced roofing and surfacing materials at relatively low cost,—a cost, indeed, in many cases below that of the unsatisfactory haphazard-colored products heretofore prepared with artificial and natural mineral granules. Besides definite, reliable, artistically correct coloring, my invention affords the advantage of permanence in the color effects, both as against change in the colors themselves and as against obscuration by adherent dirt from the atmosphere. Red, blue, green, brown, purple, yellow, black, or practically any color desired can be produced at pleasure. As only small amounts of coloring matter are required, expensive pigments can be employed without excessive cost, and the richest, most brilliant or most delicate color effects thus produced ad libitum. The invention affords the further advantage of utilizing what would otherwise be waste material.

As raw material for the purpose of my invention, I employ ceramic wastes, such as (preferably) the vitrified or semi-vitrified wastes produced in the manufacture of sanitary porcelain, wall and floor tile, electric insulators, etc. For this purpose, I crush and classify the waste, screening out and utilizing granules of about 0.1 inch size or diameter. Such waste granules are usually white or of other neutral shades; and although neutral tints are almost devoid of decorative color value in themselves, they nevertheless lend themselves very admirably to my methods.

I adapt the crushed ceramic waste granules to my purpose by superficial decorative coloring in the nature of a ceramic or vitreous coating or glaze on the individual particles. For this purpose, I may coat the particles (in any suitable manner) with a composition of or including coloring matter which after firing will give the desired color effect. Various metals (e. g., copper or lead) and metallic salts will serve very well as pigments for this purpose, fusing with the surfaces of the granules at temperatures well below the fusion point of the latter, especially with aid of fluxes such as are used in the ceramic art for glazing and enamelling purposes. In general, a temperature of about 1000° C. will suffice to produce a well-fused glaze or enamel surface without fusing the ceramic base or body material of the granules at all. When applied, the material may have the consistency of a slurry,—either extended in water, or of an oily nature,—comprising pigments and flux such that when the wet-coated granules are fired in a kiln, the coating will set and fuse quickly without running or becoming sticky. A rotary kiln allows the granules to be tumbled during firing, thus agitating them sufficiently to prevent them from aggregating or fusing together. To prevent the particles from subsequently sticking, they may be rapidly or suddenly cooled with water as they come from the kiln.

The definitely colored granular product thus obtained may be applied to form the weather surface of prepared roofing in the usual manner, by embedding the particles in the hot bituminous coating of a bituminously impregnated base and allowing the product to cool,—when any superfluous particles can readily be shaken off.

The roofing thus surfaced can be given any desired definite coloring, and thus made the means of realizing any color scheme or effect desired. The colored ceramic or vitreous coating covers the individual particles completely, and not only prevents them from being stained or otherwise discolored from the weather, but from absorbing oil or the like from the bituminous coating in which they are embedded, and thus deteriorating in color, tone, or brightness, etc. Also, a glaze has minimum holding power for atmospheric dirt. The natural porosity, sharpness, and roughness or "tooth" of such crushed ceramic granules not only causes the coating to adhere to them well, but also causes the coated particles to stick better in the bituminous cement of the roofing to which they are subsequently applied.

The ceramic waste which I employ as a raw material is at present a waste product with practically no utility whatever,—except for filling purposes in low ground, like ashes or other rubbish. The crushed particles of this material which are too fine for my purpose may still be disposed of in this same manner, so that the coarser ones which I utilize represent a clear gain over former practice, without any offsetting new waste whatever. The amount of pigment required for the superficial color effect is so small as to be but a minor consideration in the economy of the process, so that expensive pigments can be used without increasing the cost of the product materially.

This application is a continuation in part of an application for improvement in roofing filed by me, Serial No. 516,933, filed November 22, 1921.

Having thus described my invention, I claim:—

1. A method of preparing decorative granular surfacing material of the character described, which includes first crushing vitrified ceramic material, and then superficially glazing the individual particles with decorative coloring.

2. A method of preparing decorative granular surfacing material of the character described, which includes crushing and classifying vitrified ceramic material, coating the granules individually with flux and pigment, concurrently firing and agitating the granules, and then suddenly cooling them.

3. The method which includes concurrently firing and agitating crushed granules of vitrified material coated with glazing flux, and suddenly cooling them, to prevent aggregation of the glazed granules.

4. A surfacing material including vitrified granules individually superficially glazed with a fused colorglaze, substantially wholly coating the granules.

5. A decorative surfacing, including granules of vitrified ceramic material, individually glazed with a fused glaze in a definite color, substantially wholly coating the granules.

6. Bituminously impregnated and coated base roofing, having its weather surface mineralized with decorative superficially colored granules as set forth in claim 4.

7. The method of preparing surfacing material which includes vitrifying ceramic raw material, granulating the vitrified material, coating of vitrified granules with a glazing material and heating the coated granules to a temperature sufficient to fuse the glazing material and cause it to adhere to the granules and present a glass-like surface.

8. A method of preparing decorative surfacing material, which includes fusing a glaze superficially on granular vitrified material to form a substantially complete glass-like coating on the granules individually.

9. A surfacing material comprising granules of vitrified material individually substantially completely coated with a fused glaze.

10. A surfacing material comprising granules of ceramic material individually substantially completely coated with a fused glaze.

11. A roofing material including absorptive material impregnated and surfaced with bituminous material and granules of vitrified material individually substantially completely coated with a fused glaze adhered to the bituminous surfacing.

12. A roofing material including absorptive material impregnated and surfaced with bituminous material and granules of vitrified ceramic raw material individually substantially completely coated with a fused glaze adhered to the bituminous surfacing.

13. A method of preparing granular surfacing material, which includes first crushing vitrified material and then superficially fusing a glaze on the individual particles.

14. A method of preparing granular surfacing material, which includes firing and agitating granules of vitrified material coated with glazing flux and cooling the granules.

15. The method of preparing a surfacing material which includes fusing a glaze superficially on a granular vitrified material.

16. The method of preparing a surfacing material which includes fusing a glaze superficially on a granular vitrified ceramic material.

17. A roofing material including absorptive material impregnated and surfaced with bituminous material and granules of vitrified ceramic material individually substantially completely coated with a fused glaze adhered to the bituminous surfacing.

18. A roofing material comprising a base the surface of which is mineralized with granules as set forth in claim 9.

19. A roofing material comprising a base the surface of which is mineralized with granules as set forth in claim 10.

In testimony whereof, I have hereunto signed my name at Philadelphia, Pennsylvania, this 8th day of July, 1925.

ARTHUR W. SEWALL.